United States Patent [19]

McCabe

[11] 4,247,289
[45] Jan. 27, 1981

[54] PAPER SPRING METHOD

[76] Inventor: James E. McCabe, 12520 Pacific Ave. Apt. 7, Los Angeles, Calif. 90066

[21] Appl. No.: 90,568

[22] Filed: Nov. 2, 1979

Related U.S. Application Data

[62] Division of Ser. No. 869,055, Jan. 13, 1978, Pat. No. 4,189,131.

[51] Int. Cl.³ .................. B31D 5/04; B31D 3/02; B65H 45/20
[52] U.S. Cl. ............................. 493/386; 493/407; 493/904; 493/967
[58] Field of Search ............... 267/165, 143–144, 267/151, 22 R, 80; 93/1 WZ, 84 R, 84 TW, 1 R, 1 C, 1 F, 1 H

[56] References Cited

U.S. PATENT DOCUMENTS

| | | | |
|---|---|---|---|
| 378,212 | 2/1888 | Palmer | 93/84 R UX |
| 490,938 | 1/1893 | Yarrington | 267/165 X |
| 1,680,341 | 8/1928 | Rosenthal | 215/1 A |
| 1,819,281 | 8/1931 | Dexter | 267/165 |
| 2,305,515 | 12/1942 | Chapman | 93/1 WZ X |
| 2,855,632 | 10/1958 | Croce et al. | 267/165 X |
| 3,800,954 | 4/1974 | Lampcov | 93/84 R X |
| 4,151,787 | 5/1979 | Rohr et al. | 93/84 R X |

Primary Examiner—James F. Coan
Attorney, Agent, or Firm—Ralph B. Pastoriza

[57] ABSTRACT

A paper spring is formed by longitudinally folding a sheet along parallel fold lines to provide a strip and thence transversely folding the strip in a zigzag manner. The resulting paper spring may be contained in a paper housing in the form of an open-sided rectangular band and a series of the resulting paper spring units may be mounted on a carboard panel to provide a platen. Such springs or units provide a resilient cushion for fragile items shipped in boxes.

4 Claims, 9 Drawing Figures

PAPER SPRING METHOD

This application is a division of my copending application Ser. No. 869,055 filed Jan. 13, 1978 and entitled: PAPER SPRING METHOD AND PRODUCT, now U.S. Pat. No. 4,189,131, issued Feb. 19, 1980.

This invention relates generally to cushioning materials for use in shipping fragile items and more particularly to an all-paper spring unit and method of forming the same.

BACKGROUND OF THE INVENTION

It is well known in the art of packaging to provide cushioning members or materials in the form of corrugated cardboard along with strips of paper folded in a zigzag or accordion manner. Typical examples are shown in U.S. Pat. Nos. 987,958 issued Mar. 28, 1911; 2,742,219 issued on Apr. 17, 1956; and 2,978,163 issued on Apr. 4, 1961.

While the foregoing types of cushioning are all made of paper or cardboard and thus are relatively inexpensive, they do not really provide a true "spring" in the sense of a metal type compression spring. The zigzag or accordion type folded paper strip or even cardboard strip while serving as a space filler is in a sense "frangible" in that once it is subjected to a large load, it will tend to remain collapsed rather than spring back to its initial configuration. While some spring-back, of course, occurs depending primarily on the thickness of the paper initially employed in forming the spring, a tendency results for the various fold to collapse more and more, the more persistent a load is provided thereon. In other words, a single fold in a strip of paper tends to crease and really not offer the desired resistance to movement. As a consequence, once one or more such accordion type pleats are smashed or collapsed, they tend to stay in such position and thus not function in a continuous manner to provide appropriate cushioning. The problem is particularly aggravated when packages are subjected to bumps and the like over prolonged periods of time such as in cross-country shipping in trucks.

BRIEF DESCRIPTION OF THE PRESENT INVENTION

Bearing the foregoing in mind, the present invention contemplates an all-paper packaging material in the form of a basic paper spring formed in a unique manner to overcome the disadvantages of known paper springs.

More particularly, in accord with my invention, I have discovered that by folding a strip of paper such as tag paper in the same direction to form a narrow strip, and thence folding this strip in a zigzag accordion manner a true spring configuration results. In other words, the paper spring returns substantially to its initial position even after prolonged flexing. This desirable result is the direct consequence of the method employed in forming the strip.

The resulting strip may be held in an open rectangular band of paper to provide a modular spring unit. Several of these units may be positioned in side-by-side relationship and glued to a flat cardboard sheet to provide a cushioning platen of desired area. Six such platens can be used to line a shipping carton and thus provide complete protection for a frangible item.

BRIEF DESCRIPTION OF THE DRAWINGS

A better understanding of the paper spring method and product of this invention will be had by referring to the accompanying drawings in which.

DETAILED DESCRIPTION OF THE PREFERRED EMBODIMENT

Figure 1:
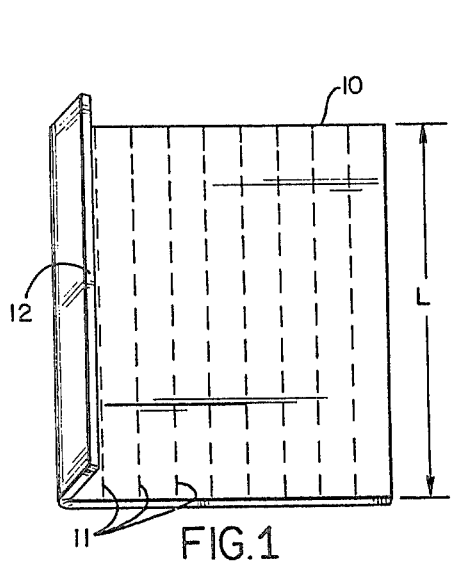
FIGS. 1, 2, 3 and 4 illustrate by means of perspective views successive steps in accord with the method of this invention for forming a paper spring.

Referring first to FIG. 1, the basic method of providing a paper spring in accord with the invention includes the steps of first longitudinally folding a sheet of paper 10 along a plurality of fold lines indicated by the dashed lines 11 parallel to one edge 12 of the paper.

Figure 2:
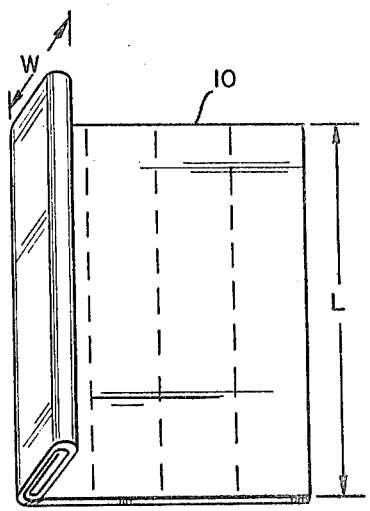

FIG. 2 illustrates the paper 10 of FIG. 1 in the process of such folding and it will be evident that the folding takes place in the same direction to provide a strip of folded paper of length L equal to the length of the one edge 12.

Figure 3:
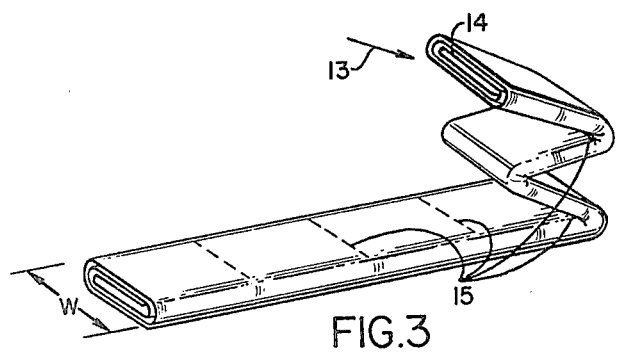

FIG. 3 illustrates the folded strip and it will be understood that the first described folding is such that when this strip is viewed from one end such as in the direction of the arrow 13 of FIG. 3, the folded configuration defines a flattened spiral 14.

Still referring to FIG. 3, there is illustrated a subsequent step of folding the formed strip in a zigzag accordion manner back and forth in successively opposite directions along a series of parallel fold lines indicated by the dashed lines 15 running transverse to the length of the strip.

Figure 4:
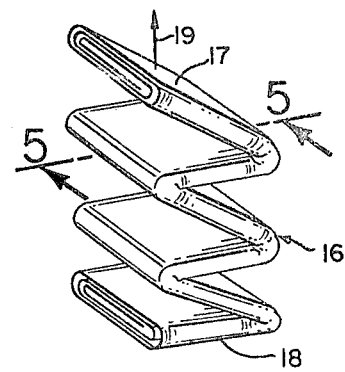

FIG. 4 shows at 16 the paper spring after the second folding operation described in FIG. 3 has been completed. The particular folding is such that the end portions of the first and last transverse folds indicated at 17 and 18 are biased apart by the tendency of the transverse accordion folds to spring apart This biasing apart resilient force is indicated by the arrow 19.

The paper spring 16 described in FIG. 4 is to be distinguished from prior art accordion type folds of simple strips of paper or cardboard. The basic distinguishing feature is the fact that a double folding operation takes place to form the paper spring 16; to wit, first the longitudinal folding of the sheet of paper in the same direction to form a strip and second, the transverse zigzag folding to provide the completed paper spring of FIG. 4.

Figure 5:
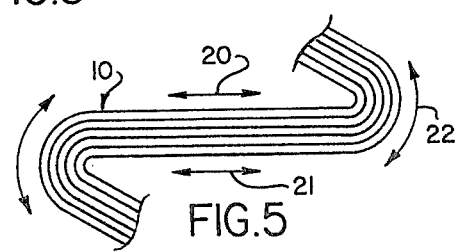
FIG. 5 is an enlarged fragmentary cross section of the paper spring taken in the direction of the arrows 5—5 of FIG. 4.

Considering now the enlarged cross section on line 5—5 of the zigzag fold of the paper spring 16 of FIG. 4 as illustrated in FIG. 5, when the spring is flexed, the various layers of paper resulting from the first folding to form the strip tend to slide relatively to each other, such sliding being opposed by friction of the engaging faces of the layers. The back and forth sliding tendency is indicated by the arrows 20 and 21. Essentially, the engagement of the various layers resulting from the initial folding and the resulting friction tend to oppose any relative shifting to each other; that is, these layers tend to remain in their initial relationship and the opposition to relative sliding frictional movement provides some of the spring in the strip.

In addition to the foregoing, the actual folded portions at the fold lines provide spring-back type forces because of their resistance to stretching upon squeezing of the paper spring. Thus the outer layer will have a greater stretching force than the inner layers and the radii will always tend to increase providing the desired spring-back. These biasing forces are indicated by the double-headed arrow 22 in FIG. 5.

Finally there is a "binding" or crimping along the outer edge of the zigzag fold generating a resistance as a consequence of the initial folding of the strip to compression of the paper spring which crimping tends to return the spring after compression.

The fact that the layers of paper can slip or slide relatively to each other results in an overall spring-back force which constitutes the integrated sum of individual forces applied by the layers. If a relatively thick strip of paper were simply folded transversely, there would, of course, be some spring-back because the outer surface of the thick paper would tend to stretch upon compression at the folding portions while the inner surface would tend to be compressed. However, to attempt to form a thick paper spring in this manner would result in so much outer tension when the same is folded it would tend to split the paper. On the other hand, if a relatively thin single strip of paper is utilized and folded in an accordion manner, there simply is not provided any appreciable spring-back force because of thinness involved.

I have found that by forming paper springs as described in conjunction with FIGS. 1-4, a surprising and unexpected spring action results which will be maintained over prolonged compressions of the spring.

In FIGS. 1 and 2, the width W of the initially folded strip determines the overall width of the folded spring as illustrated in FIG. 4. Preferably, this width is always less than one third the length L of the initial sheet of paper to provide the final paper spring configuration illustrated in FIG. 4.

Figure 6:
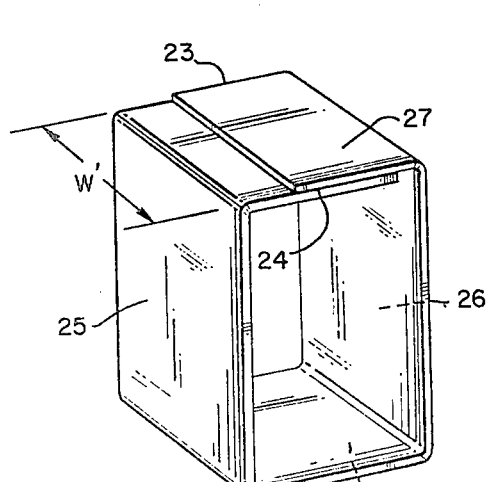
FIG. 6 is a perspective view of an open rectangular paper band for housing the paper spring of FIG. 4.

Referring now to FIG. 6, further steps making up the preferred overall combination of method steps of this invention will be described. Thus, for each of the paper springs 16 of FIG. 4 that are formed, there is also provided an open rectangular band of paper 23 formed by securing the ends of a strip of paper together as at 24 in FIG. 6. This open rectangular band has opposite sides 25 and 26 and a top and bottom 27 and 28 so dimensioned as to receive the paper spring 16 of FIG. 4 when compressed slightly.

Figure 7:
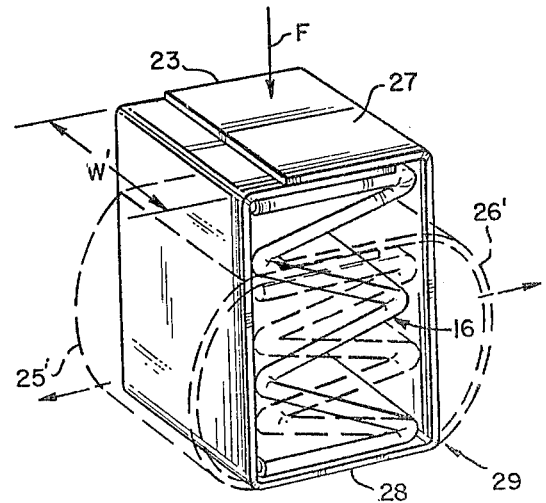
FIG. 7 is a view similar to FIG. 6 illustrating the paper spring of FIG. 4 within the paper band to provide a modular paper spring unit.

FIG. 7 shows the paper strip 16 received within the band 23 of FIG. 6 to provide a modular paper spring unit indicated generally by the arrow 29 in FIG. 7. The width indicated at W' of the open rectangular band in FIGS. 6 and 7 is at least equal to the width W of the paper strip described in FIGS. 1-4 and preferably slightly greater as illustrated in FIG. 7.

The top and bottom portions next to the first and last folds of the paper spring indicated at 17 and 18 in FIG. 4 are positioned between the top and bottom 27 and 28 of the rectangular band of FIG. 7 as shown. When a force F is applied to the top 27 of the band, the opposite side walls 25 and 26 will tend to bow outwardly as the paper spring 16 is further compressed. This outward bowing is indicated by the phantom lines 25' and 26' in FIG. 7.

Because the paper spring is under a slight compression when inserted in the rectangular housing band 23, it will easily be retained therein. On the other hand, it can also be easily manually removed and another paper spring substituted therefor if the first paper spring becomes ineffective after extremely prolonged use. Thus, the rectangular bands themselves may be reused if desired.

Figure 8:
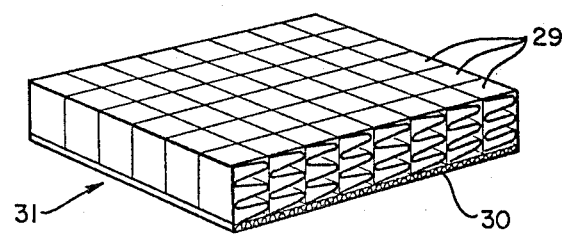
FIG. 8 is a perspective view of a plurality of modular paper spring units in side-by-side relationship secured to a flat cardboard to provide a platen unit; and, FIG. 9 is a perspective view of a cardboard carton showing various platen units such as described in FIG. 8 in exploded view preparatory to being received in the carton.

Referring now to FIG. 8, there is shown a plurality of modular paper spring units 29 positioned in side-by-side relationship to define a desired cushioning overall area. In this respect, there may be provided a flat cardboard sheet or panel 30 to which the bottoms of the various modular paper spring units 29 are glued or otherwise affixed to provide an overall platen structure designated generally by the arrow 31.

Figure 9:
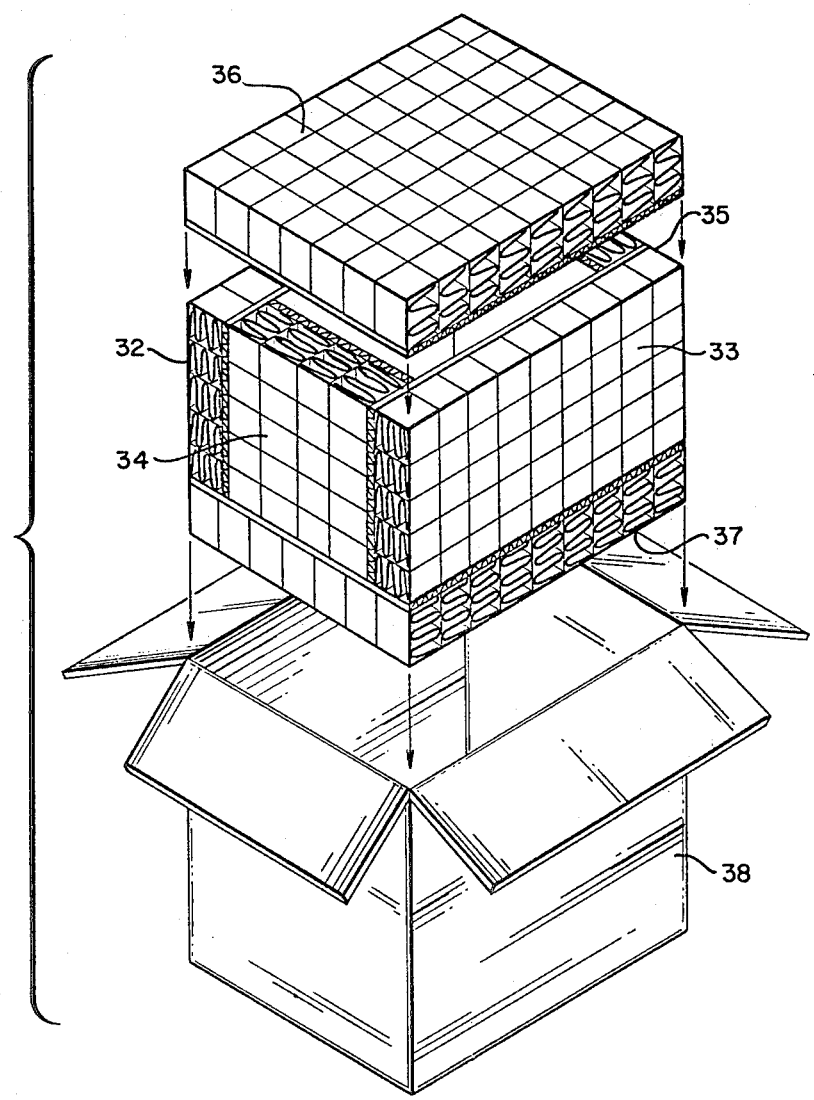

Referring to FIG. 9, several such platen structures as illustrated at 31 in FIG. 8 may be utilized to line the interior of a carton. Thus, there are illustrated six such unitary platens of given areas as at 32, 33; 34, 35; and 36, 37 to cushion the opposite sides, opposite ends, and top and bottom respectively of a shipping carton 38.

When the various modular paper spring units 29 are positioned to provide a platen as described, a surprisingly large cushioning force can easily be accommodated by the paper springs. For any frangible item disposed within the carton 38 with the various platens surrounding the same the risk of damage is greatly decreased. Normal filler paper and the like can be provided to stabilize the frangible item to be shipped should it be of an odd shape.

From the foregoing description, it will thus be evident that the present invention has provided a vastly improved all paper type spring which, when provided with the rectangular open paper band to provide a modular paper spring unit, can be used in a variety of ways for cushioning frangible items during shipment.

I claim:

1. A method of providing paper springs for cushioning articles to be shipped, including the steps of:
   (a) longitudinally folding a sheet of paper along a plurality of fold lines parallel to one edge in the same direction to provide a strip of folded paper of length equal to the length of said one edge and of a given width, the folded configuration as viewed from one end of the strip defining a flattened spiral; and
   (b) transversely folding said strip in a zigzag accordion manner back and forth in successively opposite directions along a series of parallel fold lines transverse to said length of the strip whereby the end portions of the first and last transverse folds are biased apart by the tendency of the transverse accordion folds to spring apart.

2. The method of claim 1, including the further step of longitudinally folding the paper along said plurality of fold lines a sufficient number of times to assure that said given width is less than one third said given length.

3. The method of claim 1, including the additional step of (c) securing the ends of a strip of paper together to form an open rectangular band with opposite sides and a top and bottom; and (d) inserting said paper spring into said rectangular band while under a slight compression so that the paper spring is held between the top and bottom of the band to provide a modular paper spring unit, force on the top of the band to further compress the paper spring bowing out the opposite sides of the band, whereby any number of such modular paper spring units may be assembled in side-by-side relation to provide a desired sized cushioning area.

4. The method of claim 3, in which the width of the open rectangular band is at least equal to said given width.

* * * * *